(12) United States Patent
Kim et al.

(10) Patent No.: US 7,914,204 B2
(45) Date of Patent: Mar. 29, 2011

(54) APPARATUS AND METHOD FOR MEASUREMENT OF TEMPERATURE USING OSCILLATORS

(75) Inventors: Chulwoo Kim, Seoul (KR); Janghoon Song, Geonggi-Do (KR); Gilwon Yoon, Seoul (KR); Sangdon Jung, Seoul (KR)

(73) Assignee: Korea University Industrial & Academic Collaboration Foundation, Seoul (KR)

( * ) Notice: Subject to any disclaimer, the term of this patent is extended or adjusted under 35 U.S.C. 154(b) by 463 days.

(21) Appl. No.: 12/060,479

(22) Filed: Apr. 1, 2008

(65) Prior Publication Data

US 2008/0238563 A1 Oct. 2, 2008

(30) Foreign Application Priority Data

Apr. 2, 2007 (KR) .................. 10-2007-0032360
Mar. 17, 2008 (KR) .................. 10-2008-0024582

(51) Int. Cl.
*G01K 11/26* (2006.01)
*G01K 7/00* (2006.01)

(52) U.S. Cl. ......... 374/120; 374/117; 331/176; 327/512
(58) Field of Classification Search ............... 374/170, 374/117
See application file for complete search history.

(56) References Cited

U.S. PATENT DOCUMENTS

| 3,732,728 | A | * | 5/1973 | Fitzpatrick | 340/854.4 |
| 4,513,259 | A | * | 4/1985 | Frerking | 331/176 |
| 5,214,668 | A | * | 5/1993 | Satou et al. | 374/117 |
| 5,895,629 | A | * | 4/1999 | Russell et al. | 422/94 |
| 2008/0007362 | A1 | * | 1/2008 | Partridge et al. | 331/176 |

FOREIGN PATENT DOCUMENTS

JP 11-002571 A 1/1999

* cited by examiner

*Primary Examiner* — Lisa M Caputo
*Assistant Examiner* — Mirellys Jagan
(74) *Attorney, Agent, or Firm* — Rabin & Berdo, P.C.

(57) ABSTRACT

A temperature sensor includes: a first oscillator that generates a first frequency signal; a second oscillator that generates a second frequency signal; a multiplexer that selectively passes the first frequency signal and the second frequency signal; and a frequency-to-digital converter that converts a frequency difference between the first frequency signal and the second frequency signal into a digital code.

19 Claims, 8 Drawing Sheets

<FIG. 3>
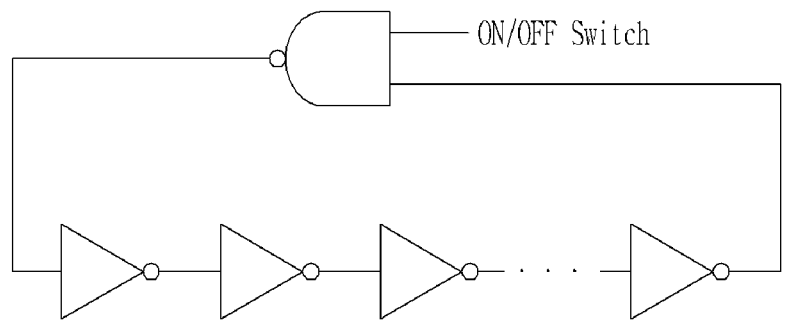
<FIG. 4>
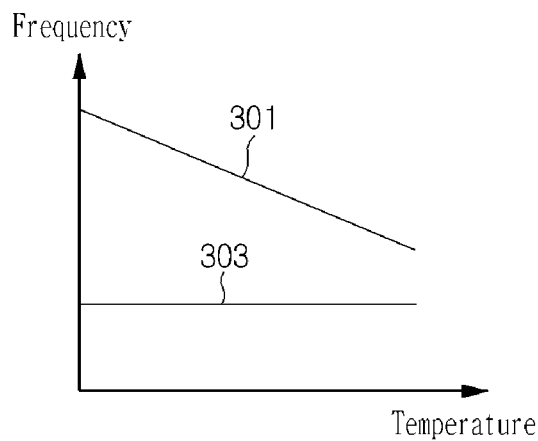
<FIG. 5>
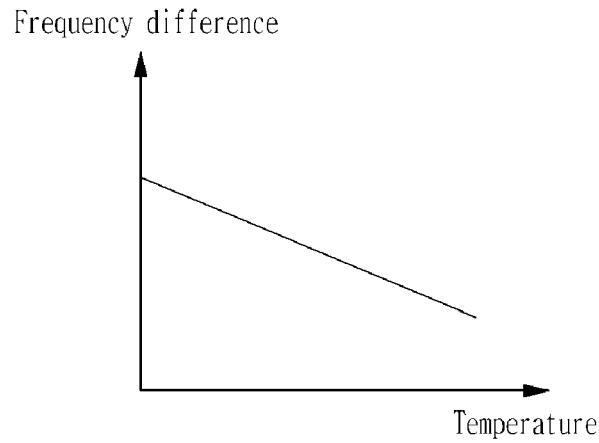

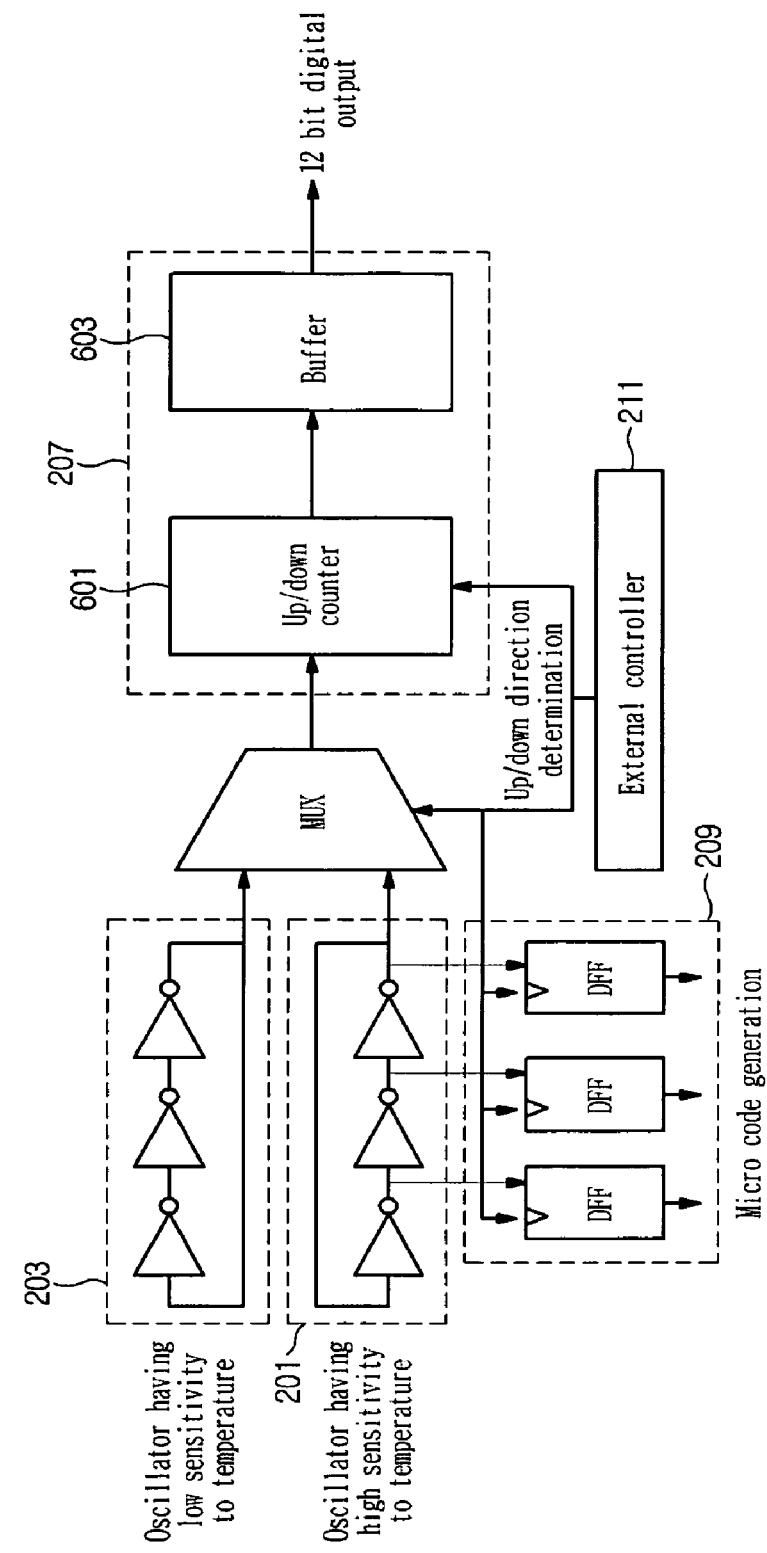
<FIG. 6>

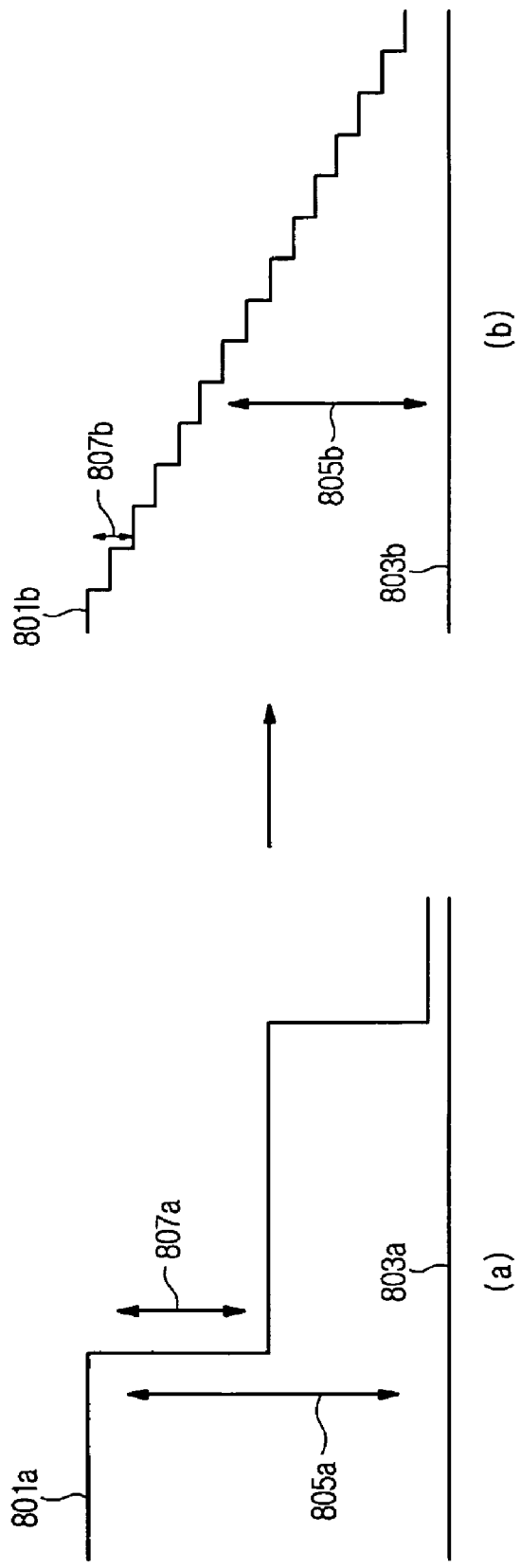
<FIG. 8>

<FIG. 9>
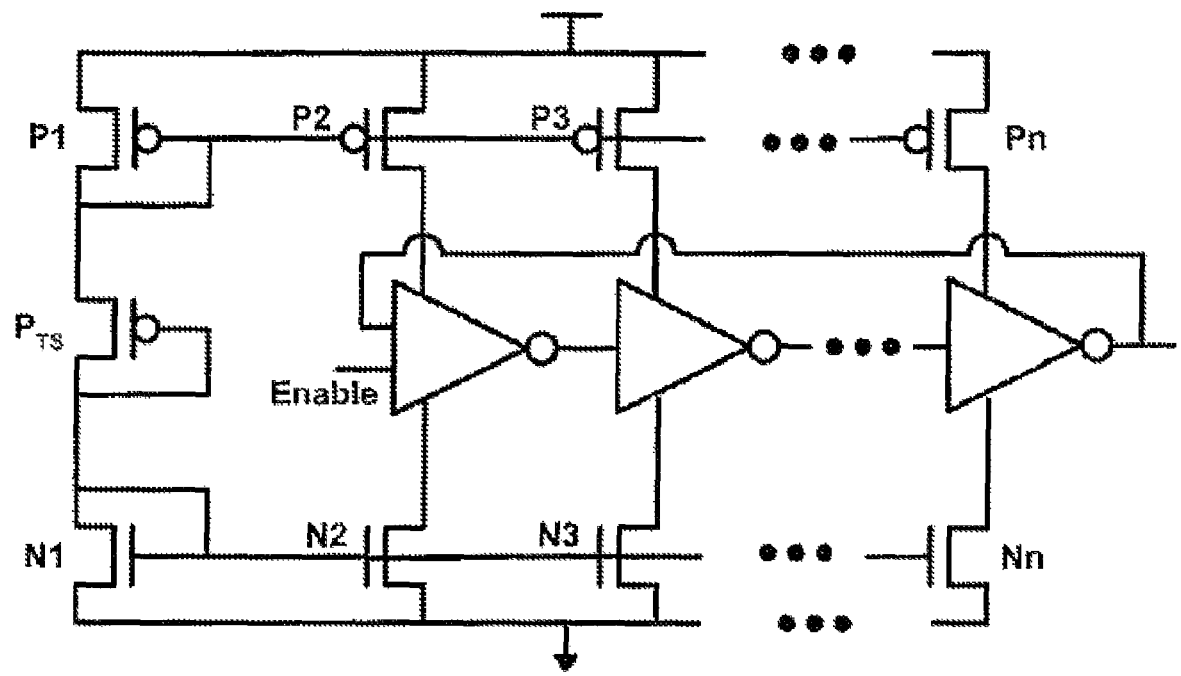
<FIG. 10>
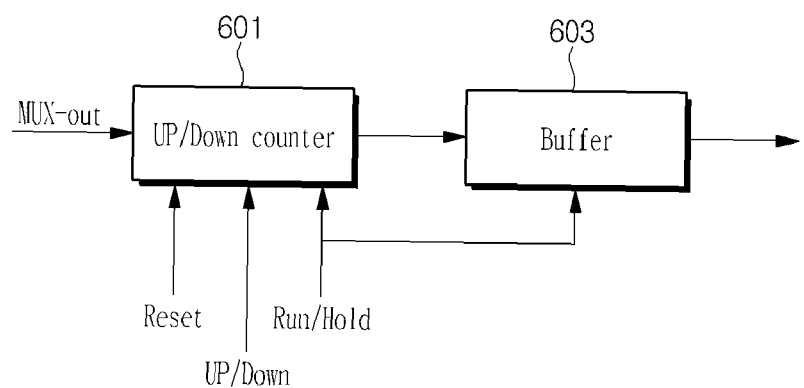

<FIG. 11>
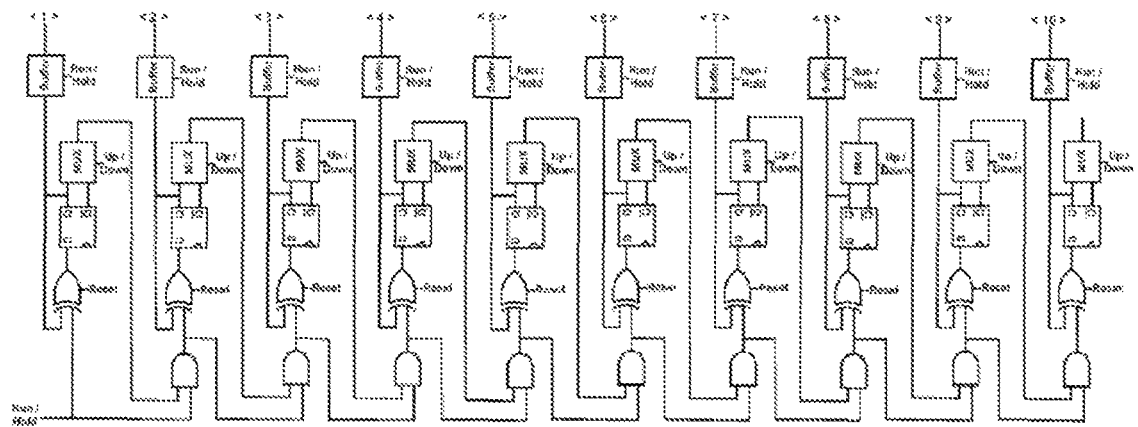
<FIG. 12>
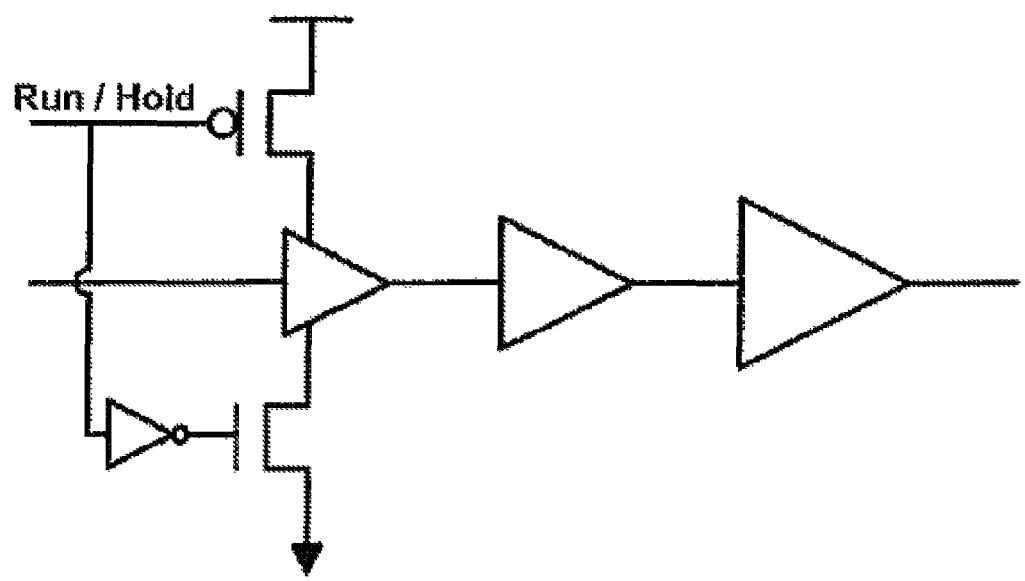

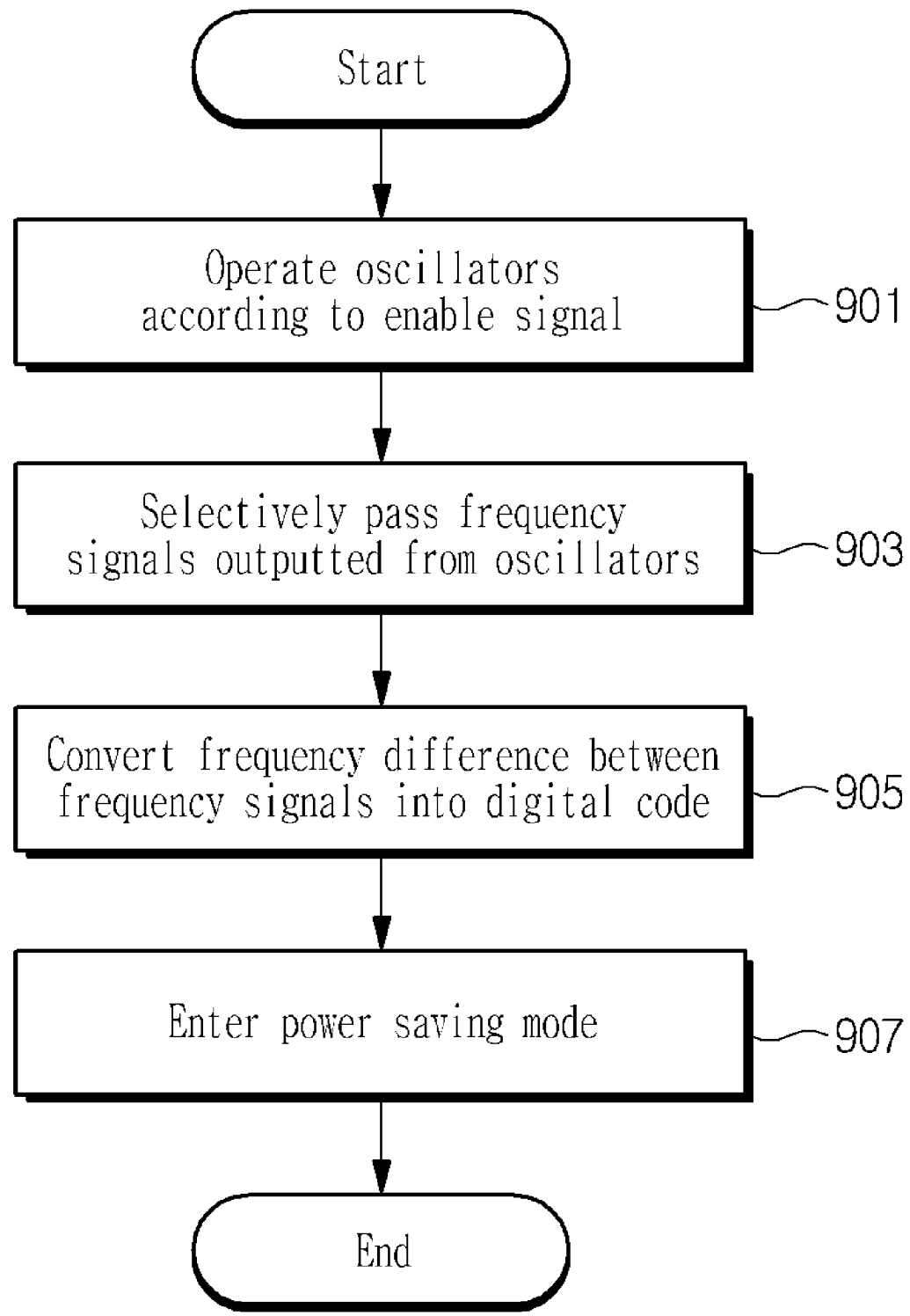

APPARATUS AND METHOD FOR MEASUREMENT OF TEMPERATURE USING OSCILLATORS

BACKGROUND OF THE INVENTION

1. Field of the Invention

The present invention relates to an apparatus and method for measurement of temperature using oscillators, and more particularly, to an apparatus and method for measurement of temperature using a frequency difference between a signal generated by an oscillator having high sensitivity to temperature and a signal generated by an oscillator having low sensitivity to temperature.

2. Description of the Related Art

A configuration of a temperature sensor manufactured using a conventional CMOS (Complementary Metal Oxide Semiconductor) process is as shown in FIG. 1. Referring to FIG. 1, a conventional CMOS temperature sensor includes a temperature detector 101 for detecting temperature, a reference unit 103 for providing a reference independent of temperature change, and an analog-to-digital converter (ADC) 105 for converting an analog signal received from the temperature detector 101 and the reference unit 103 into a digital signal. The temperature detector 101 employs a circuit to produce an output voltage in proportion to temperature using a portion of a band gap reference circuit or make the amount of a delay, which is produced by a delay line such as an inverter, proportional to temperature, or is designed to generate a signal in proportion to temperature using a special device. The reference unit 103 is mostly implemented using a band gap reference circuit or a delay line less sensitive to temperature. The analog-to-digital converter 105 is mostly an ADC of a sigma-delta type, a successive-approximation register type or a double integration type or alternatively may be implemented using a comparator or a time-to-digital converter.

However, the temperature sensors manufactured using the above mentioned conventional circuit techniques have problems of high sensitivity to temperature and high power consumption due to their analog characteristics. Moreover, these temperature sensors have problems of big circuit size due to complicated implementation and difficulty in incorporating with other electronic circuits, such as a DRAM (Dynamic RAM) or a microprocessor, into a SoC (System on a Chip).

SUMMARY OF THE INVENTION

To overcome the above problems, it is an object of the present invention to provide a CMOS temperature sensor with significantly reduced size and power consumption and a temperature measuring method.

It is another object of the present invention to provide an improved temperature measuring apparatus and method which is capable of reducing power consumption during detection of temperature and preventing wastefulness of power and occurrence of noise by stopping an oscillator after detection of temperature.

It is still another object of the present invention to provide a temperature measuring apparatus and method which is capable of providing high resolution using a multi-phase signal generated in an oscillator.

To achieve the above objects, according to an aspect of the invention, there is provided a temperature sensor including: a first oscillator that generates a first frequency signal; a second oscillator that generates a second frequency signal; a multiplexer that selectively passes the first frequency signal and the second frequency signal; and a frequency-to-digital converter that converts a frequency difference between the first frequency signal and the second frequency signal into a digital code.

Preferably, the first oscillator is an oscillator having high sensitivity to temperature and the second oscillator is an oscillator having low sensitivity to temperature.

Preferably, the second oscillator includes a circuit for compensating for temperature variation in addition to the first oscillator.

Preferably, the first oscillator and the second oscillator are gated oscillators.

Preferably, the first oscillator is an oscillator that generates a multi-phase frequency signal.

Preferably, the temperature sensor further includes a micro resolution generator that generates micro resolution codes using the multi-phase frequency signal.

Preferably, the frequency-to-digital converter includes: an up-down counter that counts up with input of the first frequency signal and counts down with input of the second frequency signal; and a counter buffer that outputs a final value counted in the up-down counter to the outside.

Preferably, the up-down counter comprises one or more one-bit up-down counters, each including a multiplexer inputted with an Up/Down control signal, an XOR gate inputted with a Reset control signal, an AND gate inputted with a Run/Hold control signal, and a flip-flop.

Preferably, the counter buffer comprises a plurality of buffer stages, and a power control transistor is connected to a power supply of the first stage of the plurality of buffer stages.

Preferably, the first and second oscillators are operated according to an enable signal and are stopped according to a disable signal.

According to another aspect of the invention, there is provided a method of measuring temperature in a temperature sensor including a first oscillator and a second oscillator, including the steps of: generating a first frequency signal from the first oscillator and a second frequency signal from the second oscillator; selectively passing the first frequency signal and the second frequency signal; and converting a frequency difference between the first frequency signal and the second frequency signal into a digital code corresponding to temperature to be measured.

Preferably, the first oscillator is an oscillator having high sensitivity to temperature and the second oscillator is an oscillator having low sensitivity to temperature.

Preferably, the first and second oscillators are stopped according to a disable signal.

Preferably, the first oscillator and the second oscillator are gated oscillators.

Preferably, the first oscillator is an oscillator that generates a multi-phase frequency signal.

Preferably, the method of measuring temperature further includes the step of generating fine resolution codes using the multi-phase frequency signal.

BRIEF DESCRIPTION OF THE DRAWINGS

The above and/or other aspects and advantages of the present invention will become apparent and more readily appreciated from the following description of the embodiments, taken in conjunction with the accompanying drawings of which:

FIG. 3 is a view showing a configuration of a gated oscillator according to a preferred embodiment of the present invention;

FIG. 4 is a graph showing a dependency of frequencies of signals, which are generated in an oscillator having high sensitivity to temperature and an oscillator having low sensitivity to temperature, on temperature according to a preferred embodiment of the present invention;

FIG. 5 is a graph showing a frequency difference between a signal generated by an oscillator having high sensitivity to temperature and a signal generated by an oscillator having low sensitivity to temperature according to a preferred embodiment of the present invention;

FIG. 6 is a view showing a configuration of a temperature sensor further including a micro resolution generator using a multi-phase frequency signal when a first oscillator is an oscillator that generates the multi-phase frequency signal according to a preferred embodiment of the present invention;

FIG. 8 is a comparative graph showing increase in resolution in the presence of a micro code generator, according to a preferred embodiment of the invention.

FIG. 9 is a circuit diagram of an oscillator having low sensitivity to temperature according to a preferred embodiment of the present invention;

FIG. 10 is a view showing a configuration of a frequency-to-digital converter (FDC) according to a preferred embodiment of the present invention;

FIG. 11 is a detailed block diagram of a frequency-to-digital converter according to a preferred embodiment of the present invention;

FIG. 12 is a view showing a configuration of a counter buffer according to a preferred embodiment of the present invention; and FIG. 13 is a flow chart illustrating a process of measuring temperature in a temperature sensor using oscillators according to a preferred embodiment of the present invention.

DETAILED DESCRIPTION OF THE PREFERRED EMBODIMENT

Hereinafter, preferred embodiments of the present invention will be described in detail with reference to the accompanying drawings.

Figure 1:
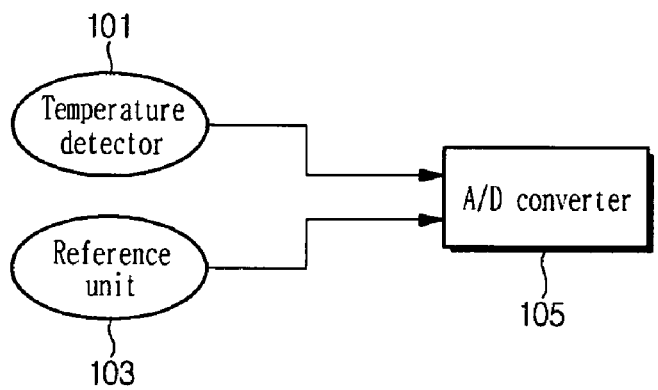
FIG. 1 is a view showing a configuration of a temperature sensor manufactured using a conventional CMOS (Complementary Metal Oxide Semiconductor) process.
Figure 2:
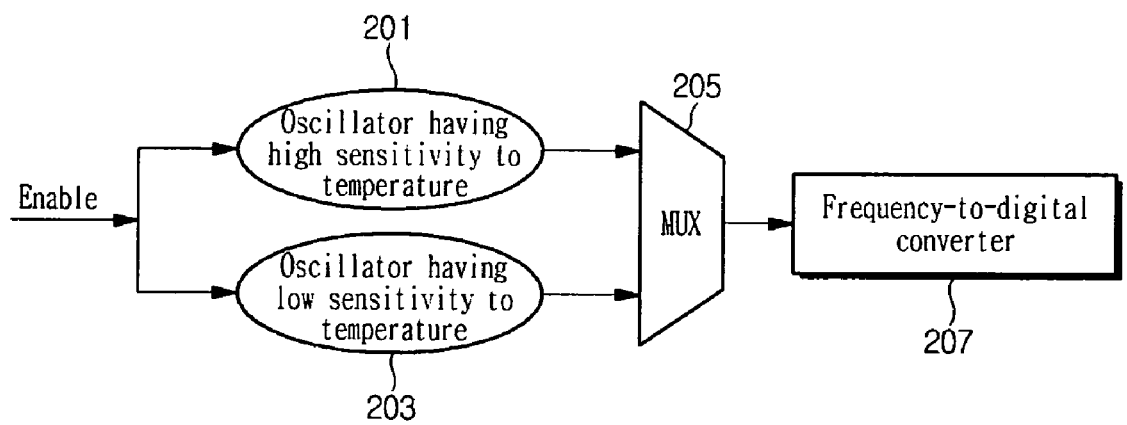
FIG. 2 is a view showing a configuration of a temperature sensor using oscillators according to a preferred embodiment of the present invention.

FIG. 2 is a view showing a configuration of a temperature sensor using oscillators according to a preferred embodiment of the present invention.

Referring to FIG. 2, a temperature sensor according to a preferred embodiment of the present invention includes two oscillators 201 and 203, a multiplexer (MUX) 205 and a frequency-to-digital converter (FDC) 207. The temperature sensor is preferably manufactured using a CMOS (Complementary Metal Oxide Semiconductor) process.

One of the two oscillators is an oscillator 201 having high sensitivity to temperature and the other is an oscillator 203 having low sensitivity to temperature. The oscillator 201 having high sensitivity to temperature may be configured as a voltage controlled oscillator or a ring oscillator. The oscillator 203 having low sensitivity to temperature may have a circuit for compensating for a change by temperature in addition to the circuit configuring the oscillator 201 having high sensitivity to temperature. In this case, the remaining parts except the circuit for compensating for a change by temperature in the oscillator 203 having low sensitivity to temperature have preferably the same configuration as the oscillator 201 having high sensitivity to temperature. This makes it possible to obtain only a parameter depending on temperature variation, excluding errors due to process variation and voltage variation. Temperature-dependent output frequencies of the two oscillators 201 and 203 are as shown in FIG. 4 where a horizontal axis represents temperature and a vertical axis represents frequency. It can be seen from the graph that an output frequency 301 of the oscillator 201 having high sensitivity to temperature decreases with increase of temperature, while an output frequency 303 of the oscillator 203 having low sensitivity to temperature is independent of temperature variation. An output frequency difference between the two oscillators 201 and 203 is as shown in FIG. 5. The temperature sensor of the invention detects temperature using the obtained temperature-dependent frequency characteristics of the oscillators 201 and 203.

The oscillator 201 having high sensitivity to temperature and the oscillator 203 having low sensitivity to temperature are operated depending on enable/disable signals.

With input of an enable signal, the oscillators 201 and 203 are operated to detect temperature. After completion of temperature detection, the oscillators 201 and 203 are stopped with input of a disable signal.

By making use of the sequential operation of the oscillator 201 having high sensitivity to temperature and the oscillator 203 having low sensitivity to temperature, when the two oscillators 201 and 203 are configured as gated oscillators as shown in FIG. 3, the two oscillators can be stopped if there is no need for their operation in a temperature detecting step, thereby preventing unnecessary power consumption. In other words, the temperature sensor has a power saving mode where the temperature sensor is operated only if necessary, and is otherwise stopped, thereby significantly reducing power consumption and preventing noise which may occur while the oscillators 201 and 203 are wastefully operating.

The MUX 205 receives frequency signals from the two oscillators 201 and 203 and selectively outputs one of these frequency signals to the FDC 207.

The FDC 207 converts a frequency signal, which is outputted from the MUX 205, into a digital code. That is, the FDC 207 selectively receives the frequency signals from the two oscillators 201 and 203 through the MUX 205 and digitizes a frequency difference between the frequency signals, which corresponds to temperature to be measured.

FIG. 6 is a view showing a configuration of a temperature sensor further including a micro resolution generator 209 using a multi-phase frequency signal when the first oscillator 201 is an oscillator that generates the multi-phase frequency signal according to another embodiment of the present invention. An up/down counter 601 and a buffer 603 shown in FIG. 6 are included in the FDC 207 and will be described in detail later with reference to FIG. 10.

The micro resolution generator 209 uses the multi-phase frequency signal generated by the temperature high-sensitive oscillator 201 to locate a signal at the point of time when the operation of the temperature high-sensitive oscillator 201 is ended according to a signal from an external controller 211 and output micro resolution as digital codes. The external controller 211 serves to equally allocate time taken to count a rising clock of a signal coming out of the temperature low-sensitive oscillator 203 and time taken to count a rising clock of a signal coming out of the temperature high-sensitive oscillator 201. Thus, the micro resolution generator 209 allows noticeable increase in resolution with no increase in power consumption.

Figure 7:
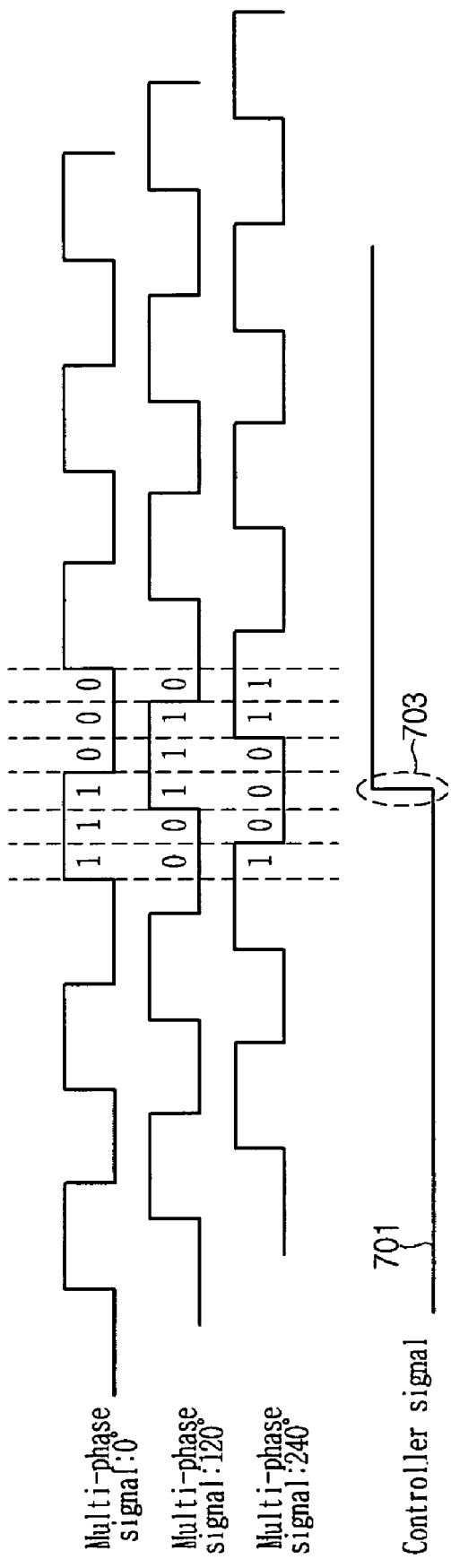
FIG. 7 is an exemplary view showing a process by a micro resolution generator to generate micro codes using a multi-phase frequency signal according to a preferred embodiment of the present invention.

FIG. 7 is an exemplary view showing a process by the micro resolution generator 209 to generate micro codes using the multi-phase frequency signal when the first temperature high-sensitive oscillator 201 generates the multi-phase frequency signal according to a preferred embodiment of the present invention.

FIG. 7 shows an example where the first temperature high-sensitive oscillator 201 generates a multi-phase signal having three different phases which serves to divide one period of a single-phase signal generated by the temperature high-sensitive oscillator 201 into 8 equal parts. In other words, if the single-phase signal is used, information between rising signals can not be used, however, when the multi-phase signals having the three different phases are used, a point of time when an up/down direction determining signal 701 sent from the external controller 211 is switched from the temperature high-sensitive oscillator 201 to the temperature low-sensitive oscillator 203 is detected, and then the micro code generator 209 generates micro codes at the detected point of time so that information between rising signals can be used, thereby guaranteeing higher resolution.

As can be seen from FIG. 7, micro codes of the temperature high-sensitive oscillator at a point of time when the external controller 211 changes direction of the up/down counter are indicated by [1 1 0]. In this manner, it can be seen that a portion that could not be expressed if the micro code generator 209 uses a single phase signal can be divided in detail, thereby increasing the resolution.

FIG. 8 is a graph showing a difference in resolution between inclusion of the micro code generator and non-inclusion of the micro code generator according to a preferred embodiment of the invention.

In FIG. 8, (a) shows a resolution in case of non-inclusion of the micro code generator and (b) shows a resolution in case of inclusion of the micro code generator.

It can be seen from (a) of FIG. 8 that a difference between a digital output 801a obtained by counting rising clocks of a signal outputted from the temperature high-sensitive oscillator 201 and a digital output 803a obtained by counting rising clocks of a signal outputted from the temperature low-sensitive oscillator 203 corresponds to temperature 805a to be measured. Accordingly, the resolution in the case of non-inclusion of the micro code generator corresponds to a difference 807a between outputtable temperatures.

In the same way, it can bee seen from (b) of FIG. 8 that the resolution in the case of inclusion of the micro code generator corresponds to a difference 807b between outputtable temperatures.

Accordingly, it can be seen that a difference between the digital output of the signal outputted from the first temperature high-sensitive oscillator 201 and the digital output of the signal outputted from the second temperature low-sensitive oscillator 203 is expressed in more detail in the case of inclusion of the micro code generator 209 than the case of non-inclusion of the micro code generator 209, thereby increasing the resolution corresponding to the temperature.

FIG. 9 is a circuit diagram of the oscillator having low sensitivity to temperature according to a preferred embodiment of the present invention.

Now, a process of compensating for temperature variation in the oscillator having low sensitivity to temperature will be described with reference to FIG. 9.

In the circuit diagram shown in FIG. 9, current flowing through a PMOS transistor P3 is expressed by the following Equation 1.

$$I_{D,P3} = \frac{1}{2}\mu C_{OX}\left(\frac{W}{L}\right)(V_{GS,P3} - V_T)^2(1 + \lambda V_{GS,P3}). \quad \text{[Equation 1]}$$

Where, $I_{D,P3}$ is current flowing through a drain of the PMOS transistor P3, $\mu$ is carrier mobility, $C_{OX}$ is capacitance of a silicon insulating layer made of oxide, W is width of MOS, L is gate length of MOS, $V_{GS,P3}$ is gate source voltage of the PMOS transistor P3, $V_T$ is threshold voltage of a MOS transistor, and $\lambda$ is factor representing an effect of drain voltage on current by channel length modulation.

In the above Equation 1, current in MOS is adjusted depending on $V_{GS}$. The MOS is operated only when $V_{GS}$ exceeds $V_T$. Although $V_{GS}$ multiplied by $\lambda$ in Equation 1 is indeed a drain source voltage ($V_{DS}$) it may be expressed as in Equation 1 since a drain is connected to a gate.

Considering temperature-dependency of the current expressed by Equation 1, Equation 1 may be replaced with the following Equation 2.

$$I_{D,P3} = \frac{1}{2}\mu_0 C_{OX}\left(\frac{W}{L}\right)\left(\frac{T}{T_0}\right)^{km} \times [V_{GS,P3} - V_T(T_0) - \alpha(T - T_0)]^2(1 + \lambda V_{GS,P3}) \quad \text{[Equation 2]}$$

Where, $\mu_0$ is carrier mobility constant at a constant temperature, T is absolute temperature, $T_0$ is reference absolute temperature constant, k and m are device information constant for material, and $\alpha$ is constant used to calculate current variation depending on temperature variation.

Differentiating the above Equation 2 with respect to temperature and finding a condition satisfying the following Equation 3, the following Equation 4 is obtained.

$$\partial I_{D,P3}/\partial T = 0 \quad \text{[Equation 3]}$$

$$V_{GS,T3} = V_T(T_0) + \alpha(T - T_0) + 2\frac{\alpha \cdot T}{km} \quad \text{[Equation 4]}$$

Where, k, m and $\alpha$ are process variables.

Putting Equation 4 into Equation 2, the following Equation 5 is obtained.

$$I_{D,P3} = \frac{1}{2}\mu_0 C_{OX}\left(\frac{W}{L}\right)(\alpha T_0)^2(1 + \lambda V_{GS,P3}). \quad \text{[Equation 5]}$$

It can be seen from the above Equation 5 that the current flowing through the transistor P3 is independent of temperature T. Accordingly, when the current $I_{D,P3}$, which is not sensitive to temperature, is applied to an oscillator indicated by a dotted portion through a current mirror composed of transistors P1 and P2 and a current mirror composed of transistors N1 and N2, the oscillator having low sensitivity to temperature shows the temperature-independent frequency characteristic.

FIG. 10 is a view showing a configuration of a frequency-to-digital converter (FDC) according to a preferred embodiment of the present invention.

Referring to FIG. 10, a frequency-to-digital converter of the invention includes an up-down counter 601 and a counter buffer 603. The up-down counter 601 is connected to a Reset signal terminal for initializing the up-down counter 601, an Up/Down signal terminal for determining whether the counter 601 counts up or down, and a Run/Hold signal terminal for determining whether the counter 601 continues to count or holds a current value. The Run/Hold signal terminal is also connected to the counter buffer 603 to control the counter buffer 603 to output an internal signal to the outside.

When a Run signal is inputted to the up-down counter 601, the up-down counter 601 receives a signal MUX_out outputted from the MUX 205 shown in FIG. 2. The signal MUX_out is one of the frequency signals which are generated in the two oscillators and selectively passed through the MUX 205. If the signal MUX_out is a frequency signal generated from the oscillator having high sensitivity to temperature, the up-down counter 601 performs a count-up operation according to an Up signal from the UP/Down signal terminal to convert the frequency signal into a digital code. On the other hand, if the signal MUX_out is a frequency signal generated from the oscillator having low sensitivity to temperature, the up-down counter 601 performs a count-down operation for the same time according to a Down signal from the UP/Down signal terminal to digitalize a frequency difference between the two frequency signals. When the digital coding of the frequency difference between the two frequency signals in the up-down counter 601 is completed, a Hold signal is inputted from the Run/Hold signal terminal to the up-down counter 601, and accordingly, the up-down counter 601 and both of the oscillators are stopped with a current value maintained in the up-down counter 601. On the other hand, when the Hold signal is inputted to the counter buffer 603, the current value maintained in the up-down counter 601 is transferred to the counter buffer 603 which then outputs the current value to the outside.

The counter buffer 603 and the up-down counter 601 are operated in an opposite manner although they are controlled according to the same Run/Hold signal. That is, with input of the Run signal from the Run/Hold signal terminal, the up-down counter 601 counts up or down while the counter buffer 603 is stopped without output of an internal value to the outside. Conversely, with input of the Hold signal from the Run/Hold signal terminal, the up-down counter 601 is stopped with the current value maintained therein while the counter buffer 603 outputs the internal value to the outside. Such an operation makes it possible to significantly reduce power consumption.

A reset signal from the Reset signal terminal is used to initialize the up-down counter 601 for measurement of temperature.

FIG. 11 is a detailed block diagram of the frequency-to-digital converter according to the preferred embodiment of the present invention. The frequency-to-digital converter shown in FIG. 11 includes 10 one-bit up-down counters, for example.

Referring to FIG. 11, each one-bit up-down counter of the frequency-to-digital converter includes an XOR gate, a flip-flop, a MUX and an AND gate. Here, the MUX, the XOR gate and the AND gate are inputted with the UP/Down signal, the Reset signal and the Run/Hold signal as their respective control signals.

With increase of the number of one-bit up-down counters of the frequency-to-digital converter, the temperature can be detected with higher resolution. Accordingly, the resolution is adjustable to the specification of a desired temperature sensor.

FIG. 12 is a view showing a configuration of the counter buffer according to the preferred embodiment of the present invention.

Referring to FIG. 12, the counter buffer of the invention uses the required number of buffer stages or inverter stages to drive a load of the last buffer stage, with a control transistor connected to a power supply of the first buffer stage for controlling supply of power to the first buffer stage according to the Run/Hold signal. With input of the Run signal, the control transistor is turned off to stop the buffer stages. On the other hand, with input of the Hold signal, the control transistor is operated to cause the buffer stages to output a signal to the outside. Accordingly, irrespective of variation of a signal at stages previous to the buffer stages, the counter buffer outputs only a value stored in the final buffer stage to the outside, which results in significant reduction of power consumption.

FIG. 13 is a flow chart illustrating a process of measuring temperature in the temperature sensor using the oscillators according to a preferred embodiment of the present invention.

Referring to FIG. 13, in the temperature sensor of the invention drives, the oscillator having high sensitivity to temperature and the oscillator having low sensitivity to temperature are operated with input of the enable signal thereto (Step 901). Then, the two oscillators generate their respective frequency signals in correspondence to their respective temperature. Thereafter, the MUX of the temperature sensor selectively passes the two frequency signals, which are output from the two oscillators, to the frequency-to-digital converter of the temperature sensor (Step 903). Thereafter, the frequency-to-digital converter converts the frequency signals, which are inputted from the MUX, into a digital code (Step 905) which is a value representing a frequency difference between the two frequency signals and corresponds to temperature to be measured.

When the temperature measurement is completed, the temperature sensor stops the two oscillators and the up-down counter according to the disable signal and enters a power saving mode (Step 907).

The CMOS temperature sensor of the present invention which has the simple configuration including the oscillator having high sensitivity to temperature, the oscillator having low sensitivity to temperature, the MUX that selectively passes the frequency signals outputted from both of the oscillators, and the frequency-to-digital converter (FDC) that converts the frequency signal inputted thereto into the digital code can be greatly decreased in it size as compared to existing temperature sensors.

In addition, with change in the number of one-bit up-down counters of the frequency-to-digital converter, the temperature can be detected with resolution changed. Accordingly, the resolution is adjustable to the specification of a desired temperature sensor.

In addition, when the oscillator having high sensitivity to temperature generates the multi-phase frequency signal, the micro resolution generator using the multi-phase frequency signal can greatly increase the resolution without increasing power consumption.

In addition, since only the digital code indicating the final temperature is outputted to the outside according to the counter buffering operation of the frequency-to-digital converter (FDC) without intermediate signals being unnecessarily outputted to the outside, power consumption can be reduced.

Moreover, since the temperature sensor employs the power saving mode where it is operated only if necessary while it is stopped if not necessary, power consumption can be reduced.

While the present invention has been particularly shown and described with reference to exemplary embodiments thereof, it will be understood by those skilled in the art that various changes in form and details may be made therein without departing from the spirit and scope of the present invention.

What is claimed is:

1. A temperature sensor comprising:
a first oscillator that generates a multi-phase frequency signal as a first frequency signal;
a second oscillator that generates a second frequency signal;
a multiplexer that selectively passes the first frequency signal and the second frequency signal;
a frequency-to-digital converter that converts a frequency difference between the first frequency signal and the second frequency signal into a digital code; and
a micro resolution generator that generates micro resolution codes using the multi-phase frequency signal,
wherein the first oscillator is an oscillator having high sensitivity to temperature and the second oscillator is an oscillator having low sensitivity to temperature.

2. The temperature sensor according to claim 1, wherein the second oscillator includes a circuit for compensating for temperature variation.

3. The temperature sensor according to claim 1, wherein the first oscillator and the second oscillator are gated oscillators.

4. The temperature sensor according to claim 1, wherein the first and second oscillators are operated according to an enable signal and are stopped according to a disable signal.

5. The temperature sensor according to claim 1, wherein the frequency-to-digital converter includes:
an up-down counter that counts up with input of the first frequency signal and counts down with input of the second frequency signal; and
a counter buffer that outputs a final value counted in the up-down counter to the outside.

6. The temperature sensor according to claim 5, wherein the up-down counter comprises one or more one-bit up-down counters, each including a multiplexer inputted with an Up/Down control signal, an XOR gate inputted with a Reset control signal, an AND gate inputted with a Run/Hold control signal, and a flip-flop.

7. The temperature sensor according to claim 5, wherein the counter buffer comprises a plurality of buffer stages, and a power control transistor is connected to a power supply of the first stage of the plurality of buffer stages.

8. The temperature sensor according to claim 1, wherein the micro resolution generator increases a resolution of the digital code.

9. The temperature sensor according to claim 8, wherein the micro resolution generator increases the resolution of the digital code by increasing a resolution of the first frequency signal of the first oscillator.

10. The temperature sensor according to claim 9, wherein the micro resolution generator increases the resolution of the first frequency signal of the first oscillator by generating micro resolution codes when an operation is changed from being performed on the first oscillator, to being performed on the second oscillator.

11. The temperature sensor according to claim 10, wherein the operation is counting rising clock cycles.

12. A method of measuring temperature in a temperature sensor including a first oscillator that generates a multi-phase frequency signal and a second oscillator, comprising the steps of:
generating a multi-phase frequency signal as a first frequency signal from the first oscillator and a second frequency signal from the second oscillator;
selectively passing the first frequency signal and the second frequency signal;
converting a frequency difference between the first frequency signal and the second frequency signal into a digital code corresponding to temperature to be measured; and
generating micro resolution codes using the multi-phase frequency signal.

13. The method according to claim 12, wherein the first oscillator is an oscillator having high sensitivity to temperature and the second oscillator is an oscillator having low sensitivity to temperature.

14. The method according to claim 12, wherein the first and second oscillators are stopped according to a disable signal.

15. The method according to claim 12, wherein the first oscillator and the second oscillator are gated oscillators.

16. The method according to claim 12, further comprising the step of using the micro resolution codes to increase a resolution of the digital code.

17. The method according to claim 16, wherein the resolution of the digital code is increased by increasing a resolution of the first frequency signal of the first oscillator.

18. The method according to claim 17, wherein the resolution of the first frequency signal of the first oscillator is increased by generating micro resolution codes when an operation is changed from being performed on the first oscillator, to being performed on the second oscillator.

19. The method according to claim 18, wherein the operation is counting rising clock cycles.

* * * * *